Dec. 15, 1970  JUNPEI INAGAKI ET AL  3,548,275
CONTROL DEVICES FOR ELECTRIC MOTORS
Filed Sept. 30, 1968  4 Sheets-Sheet 1

JUNPEI INAGAKI &
MASATERU KUNIYOSHI,
INVENTORS

Dec. 15, 1970  JUNPEI INAGAKI ET AL  3,548,275
CONTROL DEVICES FOR ELECTRIC MOTORS

Filed Sept. 30, 1968  4 Sheets-Sheet 4

United States Patent Office 3,548,275
Patented Dec. 15, 1970

3,548,275
CONTROL DEVICES FOR ELECTRIC MOTORS
Junpei Inagaki and Masateru Kuniyoshi, Yokohama-shi, Japan, assignors to Tokyo Shibaura Electric Co., Ltd., Kawasaki-shi, Japan, a corporation of Japan
Filed Sept. 30, 1968, Ser. No. 763,497
Claims priority, application Japan, Oct. 3, 1967, 42/63,401; Dec. 29, 1967, 43/84,356; July 2 1968, 43/46,062.
Int. Cl. H02p 3/22
U.S. Cl. 318—211         8 Claims

ABSTRACT OF THE DISCLOSURE

In a regenerative braking device energised for a battery or an A.C. source, a semiconductor commutator including a gate control circuit which can reverse the direction of phase shift of the ignition of the semiconductor commutator, and a switching means are provided to connect the semiconductor commutator to either a power regenerating circuit or to a free wheeling circuit, which are connected in parallel between the semiconductor commutator and the D.C. source, in response to the reversal of the direction of phase shift of the ignition.

---

Figure 1:
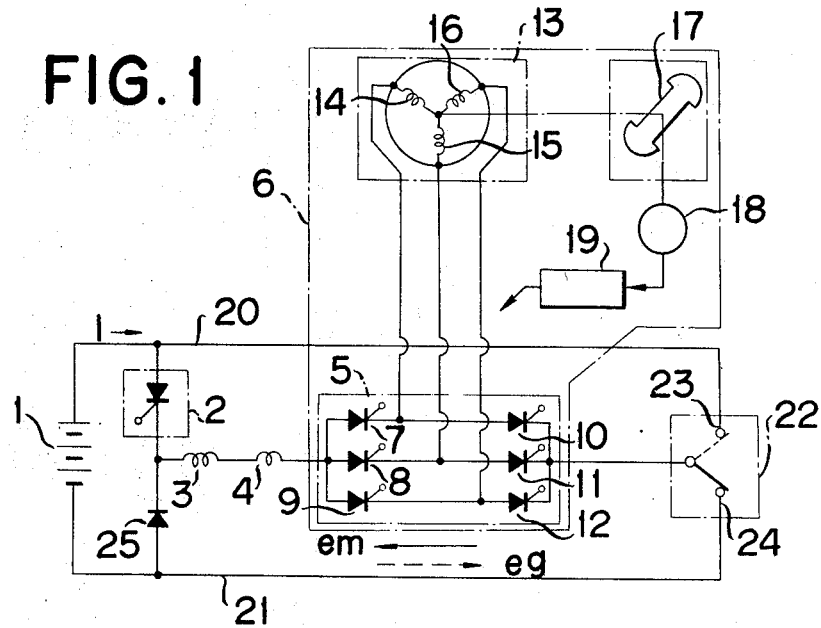

This invention relates to a control device for electric motors and more particularly to a motor control device including an improved regenerative braking device.

Generally in electric motor driving systems such as overhead trolley type electric vehicles, battery automobiles, winches and the like, regenerative braking devices are often used as means for promptly braking or stopping electric motors.

As is well known in the art, in regenerative braking, the motor is operated as a generator and the generated electric power is fed back to the D.C. source thereby to apply a counter torque to the motor for its electrical braking. In a regenerative braking device, it is necessary to reverse the polarity of input terminals of the motor. As the conventional switching means, a mechanical contact mechanism has been mainly utilised to form the polarity reversing circuit. However such a mechanical contact mechanism requires a long operating time for the polarity reversal. This constitutes a serious problem for braking or stopping a device of the type wherein quick response to the braking command is highly desirable. Moreover, the utilisation of mechanically operated component parts not only decreases reliability but also requires much labor and time for maintenance.

In one type of conventional regenerative braking devices, a D.C. chopper and a control thyristor were used wherein the latter was rendered non-conductive when applying regenerative braking. However, since the control thyristor is connected in series with the main circuit of the motor, the control thyristor consumes a considerable amount of electric power while the motor is being driven, thus decreasing the efficiency of the electric power utilisation. Such decrease in the efficiency of the electric power utilisation should be avoided especially in electric motor cars utilising secondary batteries as the D.C. source. Electric motor cars operated by secondary batteries may have car mounted battery charging devices. As the charging device, it is usual to use a semiconductor element, for instance, a silicon controlled rectifier element. But such element is required to have a large capacity owing to the requirement that battery motor cars must be charged with large current in a short period. For this reason, the weight and dimensions of the charging device become considerably large. Accordingly, when the charging device is mounted on the car, the total weight, volume and cost of the car are increased.

Accordingly, one object of this invention is to provide a control device for an electric motor including a regenerative braking device which is highly responsive, reliable and of simple maintenance wherein the speed electromotive force is switched by a contactless means at the time of applying the regenerative braking.

A further object of this invention is to provide a motor control device including a regenerative braking device which can effectively improve the efficiency of the electric power utilisation.

A still further object of this invention is to provide a motor control device including a regenerative braking device constructed such that it can also be used as a charging device for a secondary battery.

Figure 2A:
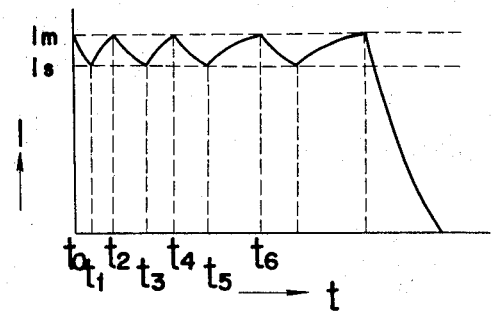
Figure 2B:
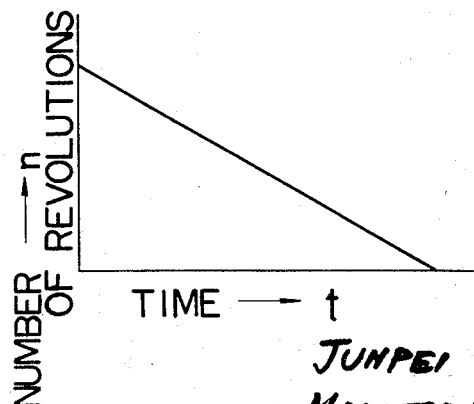
Figure 3:
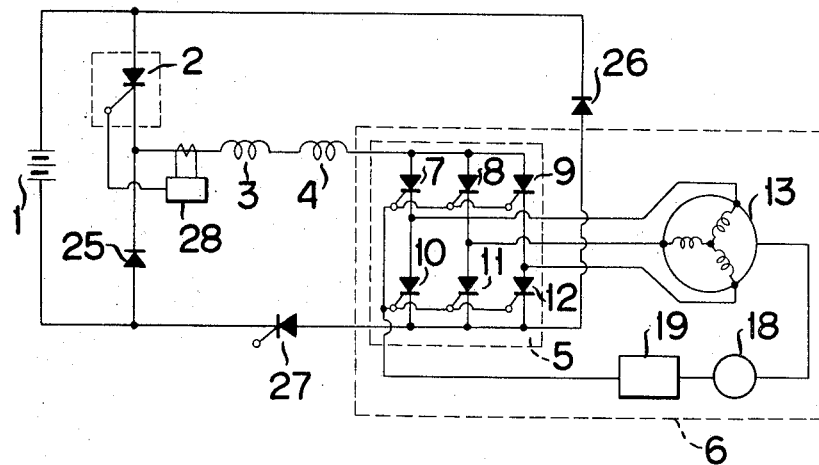
Figure 5:
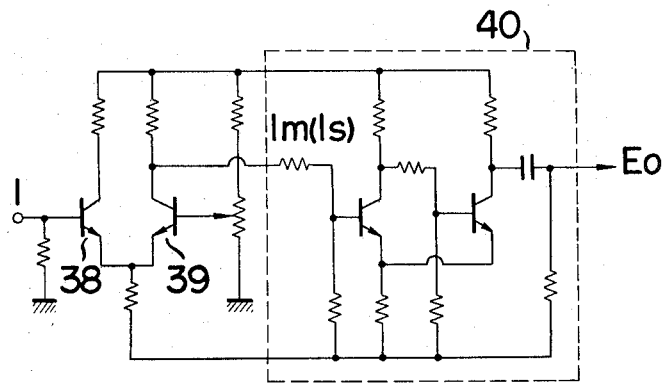
Figure 4:
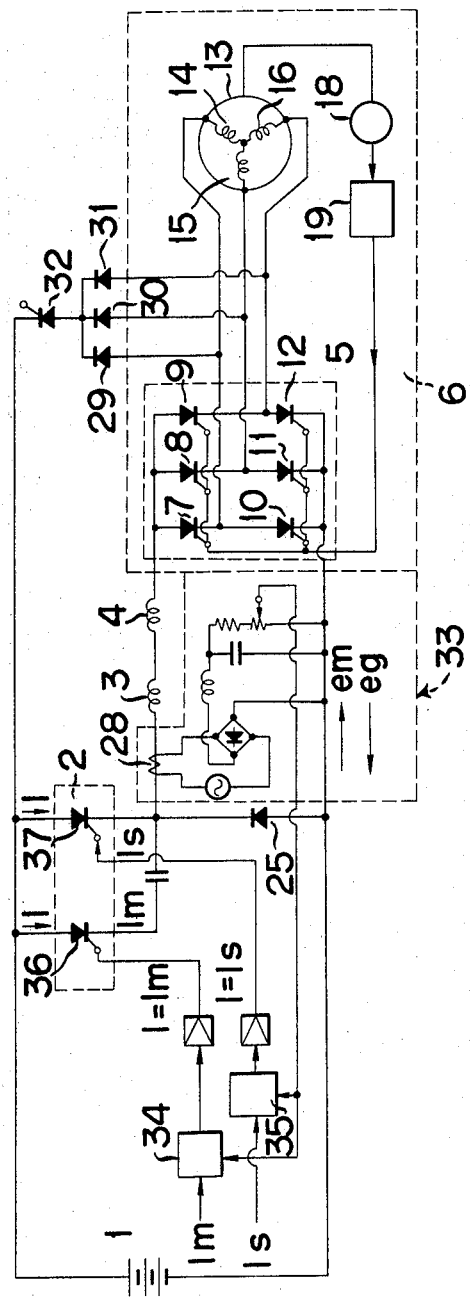
Figure 6:
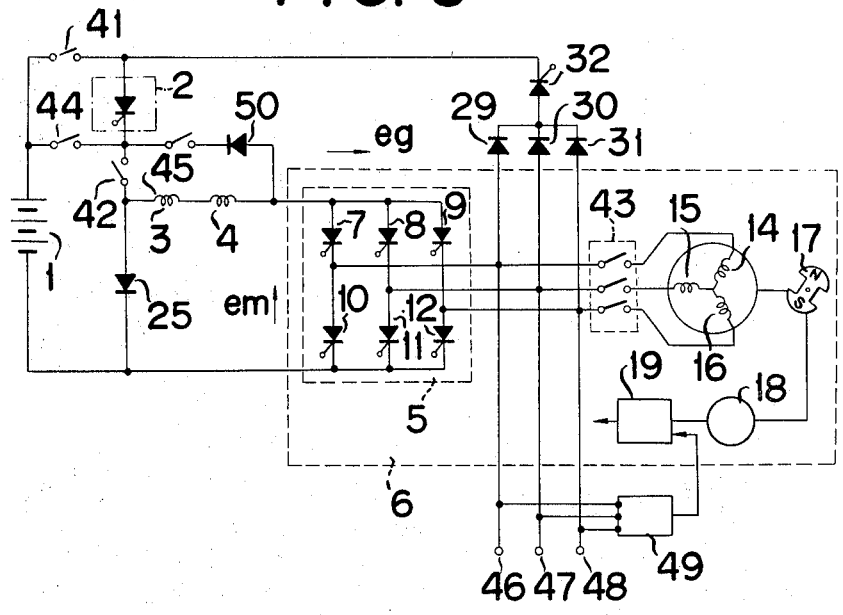
Figure 7:
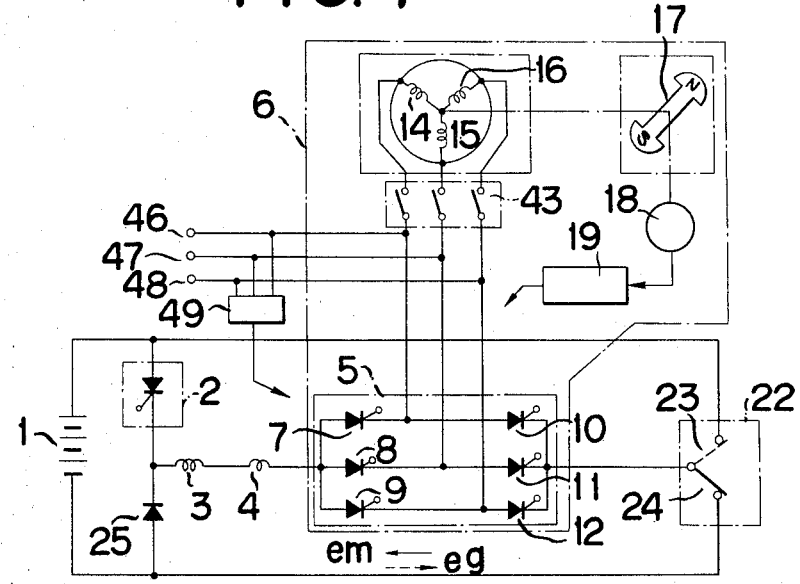

In the drawings:
FIG. 1 is a schematic diagram to aid in explaining the principle of this invention;
FIGS. 2A and 2B show waveforms to aid in explaining the operation of the circuit shown in FIG. 1;
FIG. 3 is a circuit diagram of one embodiment of this invention;
FIG. 4 is a circuit diagram of a modified embodiment of this invention;
FIG. 5 is a connection diagram of one example of a comparator employed in the circuit shown in FIG. 4;
FIG. 6 is a circuit diagram of still another embodiment of this invention; and
FIG. 7 is a circuit diagram of yet another embodiment of this invention.

Referring now to FIG. 1 of the accompanying drawing, a D.C. source 1 represents an overhead trolley wire or a secondary battery which are chargeable or can pass current generated during a regenerative braking operation. A semiconductor type commutator 5 is connected to the D.C. source 1 through a direct current controlling chopper 2 utilising a thyristor, a smoothing reactor 3 and a series field winding 4 carried by the rotor of a synchronous motor to be described hereinafter.

Semiconductor type commutator 5 comprises one element of a so-called SCR motor device 6, as shown in the drawing and includes six thyristors 7 to 12 of the so-called Graetz connection which are connected in three parallel branches each including two serially connected thyristors. Junctions between two serially connected thyristors in respective branches are connected to windings 14, 15 and 16 respectively of the motor device 6. Voltage generated by a rotor 17 of the motor device 6 and representing the speed thereof is applied to a gate control circuit 19 through a speed detector 18. The gate control circuit 19 is constructed such that it will supply ignition pulses to the gate electrodes of respective thyristors 7 to 12 of the semiconductor type commutator 5 in a predetermined direction of sequence of ignition. The gate control circuit 19 includes a reversal logic circuit which reverses the direction of the sequence of ignition. Reversal of the direction of the sequence of the ignition of thyristors 7 to 9 makes it possible to take the back electromotive force of the motor device 6 as the energy to be returned to the D.C. source 1 for regenerative braking of the motor device 6.

Between commutator 5 and D.C. source 1 are provided a regenerating (or a free wheeling) circuit 20 and a motoring circuit 21 which are connected in parallel. More particularly, a transfer switch 22 is connected to one terminal of the commutator 5 with a first or upper stationary contact 23 connected to the positive pole of the source 1 and a second or lower contact 24 connected to the negative pole of the source 1 and to the junction between the D.C. chopper 2 and the smoothing reactor 3 via a diode 25. The transfer switch 22 is interlocked with the reversal of the direction of the sequence of the ignition of the semiconductor commutator 5 to selectively connect either the electric power regenerating circuit 20 or the motoring circuit 21. The transfer switch 22 may be an electromagnetic switch or a semiconductor switch which is operated automatically.

Normal operation of the motor device 6 can be provided by throwing the transfer switch 22 to the lower contact 24. Under these conditions motor current I flows from the source 1 via chopper 2, reactor 3, field winding 4, semi-conductor commutator 5, motor windings 14, 15 and 16 and switch contact 24. The amount of the motor current I is controlled by the chopper 2 and the speed electromotive force of armature 13 has a polarity as shown by a solid line arrow $em$. To apply the regenerative braking, the transfer switch 22 is thrown to the first or upper contact 23 concurrently with the reversal of the direction of the sequence of the ignition effected by the gate control circuit 19 whereby the polarity of the speed electromotive force of the motor is reversed as shown by a dotted line arrow $eg$. Now current I flows from the source 1 through diode 25, reactor 3, field winding 4, semiconducting commutator 5 and motor armature windings 14 to 16, and transfer switch contact 23. Under these conditions the D.C. source 1 is connected to be charged for initiating the regenerative braking. FIG. 2A shows the variation of current I under these conditions. Denoting the instant at which the regenerative braking begins by $t_0$ and the initial value of the regenerating current by $Im$, it will be noted that current I decreases as the motor speed is decreased by the action of the regenerative braking and that the chopper 2 is closed at an instant $t_1$ when the current has decreased to a predetermined lower limit $Is$. Then a circulating current will be caused to flow through a circuit including reactor 3, field winding 4, semiconductor commutator 5, motor windings 14 to 16, switch contact 23 and chopper 2 by the free wheeling action caused by the smoothing reactor 3 and the series field winding 4 whereby the current increases between time instants $t_1$ and $t_2$ as shown in FIG. 2A. At time instant $t_2$ at which current I again reaches the upper limit $Im$, the chopper 2 opens to apply again regenerative braking in the same manner as above described. Thus, the motor device 6 is decelerated as shown by FIG. 2B. Detection of the upper and lower limits of the current and switching of the operation of the chopper 2 caused thereby are effected automatically as will be described later.

In the inventive embodiment shown in FIG. 3, a diode 26 and a thyristor 27 are utilised to operate as the transfer switch 22 shown in FIG. 1. During normal operation of the motor device 6, chopper 2 and thyristor 27 are turned on to pass current through a path including source 1, chopper 2, reactor 3, field winding 4, commutator 5, motor stator winding and thyristor 27, whereas during regenerative braking chopper 2 and thyristor 27 are turned off whereby current flows through a path including source 1, diode 25, reactor 3, field winding 4, commutator 5, motor stator winding and diode 26. Subsequent operation of this embodiment is identical to that described in connection with FIG. 1. As will be described later in connection with FIG. 4, the chopper 2 is rendered ON by the output from a current transformer 28.

Turning now to FIG. 4, junctions between two serially connected thyristors 7 to 12 inclusive of three parallel branches are connected to windings 14, 15 and 16 respectively of the armature 13 of the motor device 6. These junctions are also connected to the anode electrode of a thyristor 32 via respective diodes 29, 30 and 31, the cathode electrode of the thyristor 32 being connected to the positive pole of the D.C. source 1.

The operation of the embodiment shown in FIG. 4 is as follows: During normal operation of the motor device 6 the thyristor 32 is maintained in its non-conductive state to cause current I to flow from the source 1 through a path including chopper 2, smoothing reactor 3, series field winding 4, commutator 5 and armature windings 14 to 16. Under these conditions, the amount of the motor current is controlled by the chopper 2 and the motor will induce a speed electromotive force $em$ in a direction indicated by an arrow.

To apply the regenerative braking, the chopper 2 is rendered OFF. Then the electromagnetic energy that has been stored in the smoothing reactor 3 and the series field winding 4 decays to zero by passing current against the back electromotive force $em$ through a closed circuit including diode 25, smoothing reactor 3, series field winding 4, commutator 5 and armature windings 14 and 16. Then, the negative side of thyristors 10 and 12 of the commutator 5 are rendered non-conductive (this corresponds to rendering non-conductive the control thyristor shown in FIG. 3) concurrent with the reversal of the direction of phase shift of the ignition effected by the gate control circuit 19, thus enabling the deriving out of speed electromotive force of the motor device 6 in the direction as shown by an arrow $eg$. At the same time chopper 2 and thyristor 32 are rendered conductive. Then, current I due to the speed electromotive force will flow through a closed circuit including smoothing reactor 3, series field winding 4, thyristors 7, 8 and 9 of the commutator 5, armature windings 14 and 16, diodes 29, 30 and 31, thyristor 32 and chopper 2. As shown by a curve between time instants $t_1$ and $t_2$ shown in FIG. 2A, this current increases with time. Upon reaching the upper limit $Im$, chopper 2 is rendered non-conductive, thus causing current I to flow through a closed circuit including source 1, diode 25, smoothing reactor 3, series field winding 4, thyristors 7, 8 and 9 of commutator 5 armature windings 14 to 16 of the motor, diodes 29, 30 and 31 and thyristor 32. Under these circumstances, the electric power is regenerated to charge the source 1, thus braking the motor device 6. Thus, the motor is decelerated as shown by FIG. 2B and current I decreases between time instants $t_2$ and $t_3$ as shown in FIG. 2A. When the current I is decreased to reach the lower limit $Is$ the chopper 2 will be rendered conductive, thus causing current I to circulate through the closed circuit including chopper 2 in the same manner as above described. By repeating similar operations the regenerative braking is applied to the motor device to bring it to a standstill.

Application of the regenerative braking decreases linearly the number of revolutions $n$ as shown in FIG. 2B. Accordingly, as the speed electromotive force decreases similarly, the difference between the source voltage and the speed electromotive force increases thereby decreasing the periods of dissipating energy from the level $Im$ to $Is$ as shown by the periods $t_0$–$t_1$, $t_2$–$t_3$, $t_4$–$t_5$ . . . in FIG. 2A. On the other hand periods $t_1$–$t_2$, $t_3$–$t_4$, $t_5$–$t_6$ . . . representing the short circuiting periods during which energy is stored in reactances increase gradually as the speed electromotive force decreases. Current I flowing through the reactor 3 and the series field winding 4 is detected by a detector 33 energized by a shunt or a D.C. current transformer and is then rectified and filtered. The filtered current is then supplied to comparators 34 and 35 and compared therein with $Im$ and $Is$. When current I becomes equal to $Im$, the auxiliary thyristor 36 in chopper 2 is rendered conductive whereas when I reaches $Is$, thyristor 37 in chopper 2 is rendered ON. Thus, the chopper 2 is controlled in a range of $Im > I > Is$.

As shown in FIG. 5 each of comparators 34 and 35 is comprised by a differential amplifier including a pair of transistors, for example, 38 and 39 and a Schmitt circuit 40, and functions to supply limit values I$m$ and I$s$ of current I to the gate electrodes of thyristors 36 and 37, thus, rendering them ON and OFF.

As above described, according to this invention as the main circuit carrying the motor current is comprised by main component parts required for motor operation it is not necessary to use thyristors for effecting the regenerative braking which were connected in series with the main circuit according to the prior art control systems. As a result power loss during motor operation can be avoided, thus greatly improving the efficiency of the electric power utilisation. This is especially advantageous in electric vehicles driven by secondary batteries.

While in the above illustrated embodiment a series combination of diodes 29, 30 and 31 and thyristor 32 is included between the output side of the commutator 5 and D.C. source 1, thyristor 32 may be omitted when diodes 29, 30 and 31 are respectively substituted by suitable thyristors.

FIG. 6 shows a modified embodiment of this invention wherein the regenerative braking is effected when the voltage (mean value) of an external A.C. source is higher than the battery voltage. During charging, switches 41, 42 and 43 are opened but switches 44, 45 are closed to connect terminals 46, 47 and 48 to the D.C. source 1. Where the source is a single phase A.C. source two of three terminals 46, 47 and 48 are employed.

While thyristors 10, 11 and 12 of the semiconductor commutator 5 are maintained in their OFF state, the gate sequence is switched by gate control circuit such that thyristors 7, 8 and 9 act as a rectifier. It is to be understood that the gate signal is derived from the A.C. source and applied to the gate control circuit via a pulse circuit 49. Thus, the alternating current supplied to terminals 46, 47 and 48 is converted into direct current by the action of diodes 29, 30 and 31 and thyristor 32, said direct current returning back to the A.C. source through chopper 2, switch 44, D.C. source 1, diode 25, reactor 3, series field winding 4 and through thyristors 7 8 and 9. In this manner the source or battery 1 is charged. Where it is desired to control the charging current ON-OFF control of the chopper 2 is performed. When the chopper 2 is rendered OFF, the electro-magnetic energy stored in the reactor 3 and series field winding 4 will be dissipated through a circuit including diode 50, switches 45 and 44, source 1 and diode 25, thus effecting free wheeling.

Upon completion of charging, switches 41, 42 and 43 are closed whereas switches 44 and 45 are opened to disconnect terminals 46, 47 and 48 from the external A.C. source, thus resuming the free wheeling operation. Further, by controlling thyristors 7, 8 and 9 to act as an inverter and by restorting thyristor 32 to its OFF state, the normal motor operation can be resumed. Where the voltage of the external A.C. source is lower than that of the battery voltage, the battery 1 can be charged by the regenerated electric power.

FIG. 7 shows another embodiment of this invention. In this embodiment when switch 22 is thrown to upper contact 23, commutator 5 is controlled to act as a rectifier by the gate control circuit 19, chopper 2 is rendered OFF and when three phase switch 43 is closed to connect terminals 46, 47 and 48 to the armature windings 14 to 16 source, commutator 5 will provide D.C. voltage to pass current through a circuit including contact 23 of switch 22, battery 1, diode 25, reactor 3 and field winding 4 thereby charging the battery 1. The control of the charging current can be readily effected by controlling the ignition angle of thyristors 7 to 12 by an ignition phase. In the same manner as has been described in connection with FIG. 6, the chopper 2 may be used for this purpose. Upon completion of the charging, the control is restored to the original state to resume normal motor operation or free wheeling operation. Again, where the voltage of the external A.C. source is lower than the battery voltage the battery 1 can be charged by the regenerated electric power of the motor device 6.

What is claimed is:

1. A control device for an electric motor comprising:
   a D.C. source;
   a first series circuit coupled across said D.C. source, said series circuit including the series combination of a thyristor chopper circuit, a smoothing reactor, a field winding of said motor, and a commutator including a plurality of thyristors, said commutator having first, second and output terminals, one of said first and second terminals of said commutator being connected to one of the poles of said D.C. source via said field winding and said smoothing reactor;
   a diode connected in parallel with the series circuit including said smoothing reactor, said field winding and said commutator;
   means coupling the armature of said motor to the output terminals of said commutator;
   means including at least one thyristor to selectively couple a given terminal of said commutator to a first pole of said D.C. source during the regenerative braking and free-wheeling operations of said motor and to a second pole of said D.C. source during the motoring operation thereof; and
   a gate control circuit responsive to a signal developed by said motor for supplying ignition pulses to the gate electrodes of the respective thyristors of the commutator in a predetermined sequence of ignition thereof, said gate control circuit including a reversal logic circuit responsive to said motor signal for reversing the direction of the sequence of ignition during said regenerative braking operation.

2. A control device according to claim 5 wherein said selectively connecting means comprises a plurality of thyristors connected in a half-wave bridge between the output terminals of said commutator and the positive pole of said D.C. source and means to render non-conductive the thyristors on the negative side of said commutator at the time of applying regenerative braking.

3. A control device according to claim 5 wherein said selectively connecting means comprises a series circuit including diodes connected in a halfwave bridge and a thyristor, said series circuit being connected between the output terminals of said commutator and the positive pole of said D.C. source, and means to render non-conductive the thyristors on the negative side of said commutator at the time of applying regenerative braking.

4. A control device according to claim 5 further comprising a source of external A.C. power; a first switching means to disconnect said commutator from the armature winding of said motor and to connect said commutator to said external A.C. source to charge said D.C. source; a semiconductor chopper; and a second switching means connecting said semiconductor chopper between said external A.C. source, and said D.C. source, said semiconductor chopper controlling the charging current from said external A.C. source.

5. A control device according to claim 1 wherein said given terminal of said commutator corresponds to the other of said first and second terminals.

6. A control device according to claim 1 wherein said given terminal of said commutator corresponds to said output terminals.

7. A control device according to claim 1 wherein said chopper comprises first and second thyristors controlled by first and second comparators, respectively; a first comparator detecting a first level of the current flowing in said first series circuit; and a second comparator detecting a second level of the current flowing said first series circuit, said first level corresponding to regenerative braking operation and said second level corresponding to free wheeling operation.

8. A control device according to claim 4 wherein said source of A.C. power comprises terminals coupled to said switching means which are adapted to be connected to an external A.C. power source.

References Cited

UNITED STATES PATENTS

| | | | |
|---|---|---|---|
| 3,325,714 | 6/1967 | Torii | 318—376 |
| 3,354,370 | 11/1967 | Corry et al. | 318—227 |
| 3,365,638 | 1/1968 | Risberg | 318—227 |
| 3,365,642 | 1/1968 | Risberg | 318—376 |
| 3,406,325 | 10/1968 | Rosa | 318—227 |
| 3,463,991 | 8/1969 | Yuminaka et al. | 318—379 |

ORIS L. RADER, Primary Examiner

K. L. CROSSON, Assistant Examiner

U.S. Cl. X.R.

318—227, 258, 376